(12) United States Patent
Lin et al.

(10) Patent No.: US 7,907,061 B2
(45) Date of Patent: Mar. 15, 2011

(54) PROXIMITY SENSORS AND METHODS FOR SENSING PROXIMITY

(75) Inventors: Xijian Lin, Fremont, CA (US); Zhong Li, Campbell, CA (US); Wendy Ng, San Jose, CA (US); Phillip J. Benzel, Pleasanton, CA (US); Oleg Steciw, Los Altos, CA (US)

(73) Assignee: Intersil Americas Inc., Milpitas, CA (US)

( * ) Notice: Subject to any disclaimer, the term of this patent is extended or adjusted under 35 U.S.C. 154(b) by 422 days.

(21) Appl. No.: 12/101,047

(22) Filed: Apr. 10, 2008

(65) Prior Publication Data
US 2009/0121889 A1 May 14, 2009

Related U.S. Application Data

(60) Provisional application No. 60/988,047, filed on Nov. 14, 2007.

(51) Int. Cl.
*G08B 21/00* (2006.01)
(52) U.S. Cl. .................................. 340/686.6
(58) Field of Classification Search ............... 340/686.6, 340/527, 545.3, 555, 513; 455/41.2; 250/221
See application file for complete search history.

(56) References Cited

U.S. PATENT DOCUMENTS

| | | | | |
|---|---|---|---|---|
| 4,128,760 | A * | 12/1978 | Del Signore, II | 250/214 B |
| 4,879,461 | A * | 11/1989 | Philipp | 250/221 |
| 5,103,085 | A * | 4/1992 | Zimmerman | 250/221 |
| 5,991,040 | A | 11/1999 | Doemens et al. | |
| 6,392,755 | B1 | 5/2002 | Levecq et al. | |
| 6,956,518 | B1 | 10/2005 | Piasecki et al. | |
| 7,728,316 | B2 * | 6/2010 | Fadell et al. | 250/559.38 |
| 2007/0099574 | A1 * | 5/2007 | Wang | 455/67.11 |
| 2009/0224952 | A1 | 9/2009 | Funabashi | |
| 2009/0244014 | A1 | 10/2009 | Hotelling et al. | |

FOREIGN PATENT DOCUMENTS

JP 2007071564 3/2007

OTHER PUBLICATIONS

International Search Report and Written Opinion in connection with PCT/US2008/080985 dated Apr. 29, 2009, 10 pages.
"Infrared beam barrier/proximity sensor," http://www.uashem.com/pageid-57.html, © UaShem.com (Source: www.electronic-circuits-diagrams.com, published Feb. 1, 2005).
"Proximity Sensor," http://en.wikipedia.org/wiki/Proximity_sensor (accessed Apr. 16, 2008).
"Infrared IP Proximity Detector/IR Beam Barrier Circuit Diagram," http://www.electronics-circuits-diagrams.com/alarmsimages/alarmsckt19.shtml, © www.electronic-circuits-diagrams.com 2006.

* cited by examiner

*Primary Examiner* — Phung Nguyen
(74) *Attorney, Agent, or Firm* — Fliesler Meyer LLP

(57) ABSTRACT

In an embodiment, a proximity sensor includes a driver, a photo-diode (PD) and an analog-to-digital converter (ADC). The proximity sensor can also include a controller to control the driver. The driver selectively drives a light source, e.g., an infrared (IR) light emitting diode (LED). The PD, which produces a current signal indicative of the intensity of light detected by the PD, is capable of detecting both ambient light and light produced by the light source that is reflected off an object. The ADC receives one or more portion of the current signal produced by the PD. The ADC produces one or more digital output that can be used to estimate the proximity of an object to the PD in a manner that compensates for ambient light detected by the PD and transient changes to the detected ambient light.

25 Claims, 11 Drawing Sheets

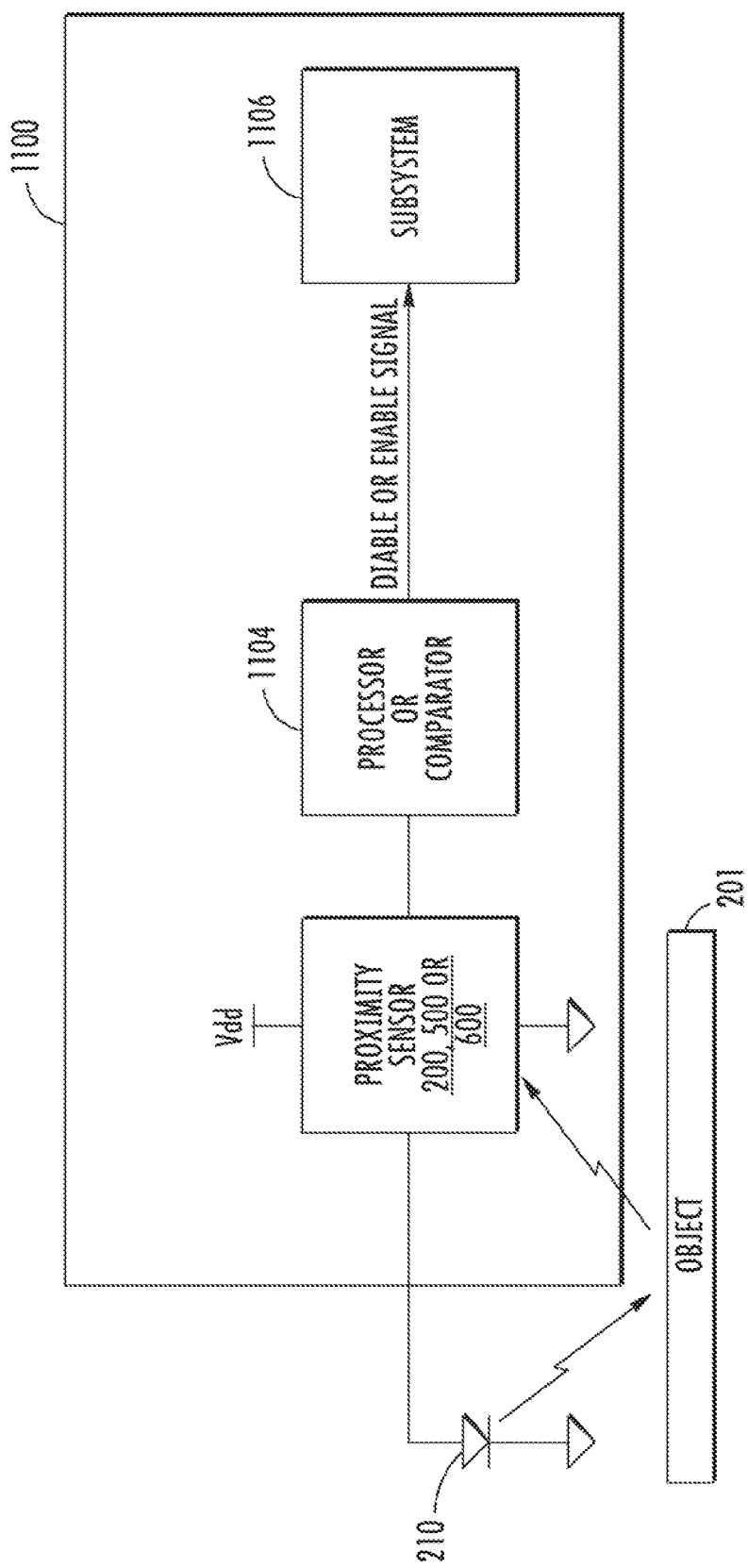

PROXIMITY SENSORS AND METHODS FOR SENSING PROXIMITY

PRIORITY CLAIM

This application claims priority under 35 U.S.C. 119(e) to U.S. Provisional Patent Application No. 60/988,047, filed Nov. 14, 2007, which is incorporated herein by reference.

SUMMARY

In accordance with an embodiment of the present invention, a proximity sensor includes a driver, a photo-diode (PD) and an analog-to-digital converter (ADC). The proximity sensor can also include a controller to control the driver. The driver selectively drives a light source, e.g., an infrared (IR) light emitting diode (LED). The PD, which produces a current signal indicative of the intensity of light detected by the PD, is capable of detecting both ambient light and light produced by the light source that is reflected off an object. The ADC receives one or more portion of the current signal produced by the PD. The ADC produces one or more digital output that can be used to estimate the proximity of an object to the PD in a manner that compensates for ambient light detected by the PD and transient changes to the detected ambient light.

In accordance with an embodiment, a method for use in monitoring the proximity of an object includes detecting an intensity of both ambient light and light produced by a light source that is reflected off the object, during one or more time period. During one or more further time period, the intensity of the ambient light is detected. Based on the intensities detected, an output can be produced that indicative of the intensity of the detected light produced by the light source that is reflected off the object, with the affect of the ambient light and transient changes thereto substantially removed. Such an output can be used to estimate the proximity of the object.

Further and alternative embodiments, and the features, aspects, and advantages of the embodiments of invention will become more apparent from the detailed description set forth below, the drawings and the claims.

BRIEF DESCRIPTION OF THE DRAWINGS

FIG. 11 is a high level block diagram of a system according to an embodiment of the present invention.

BACKGROUND

Infrared (IR) proximity sensors are becoming popular in cell-phone and handheld-device applications. For example, the sensor can be used to control a touch-screen interface for portable electronics devices. When an object, such as a person's finger, is approaching, the sensor detects the object. When the object is detected, a touch-screen interface or the like may perform an action such as enabling or disabling a display backlight, displaying a "virtual scroll wheel," navigation pad or virtual keypad, etc.

Figure 1A:
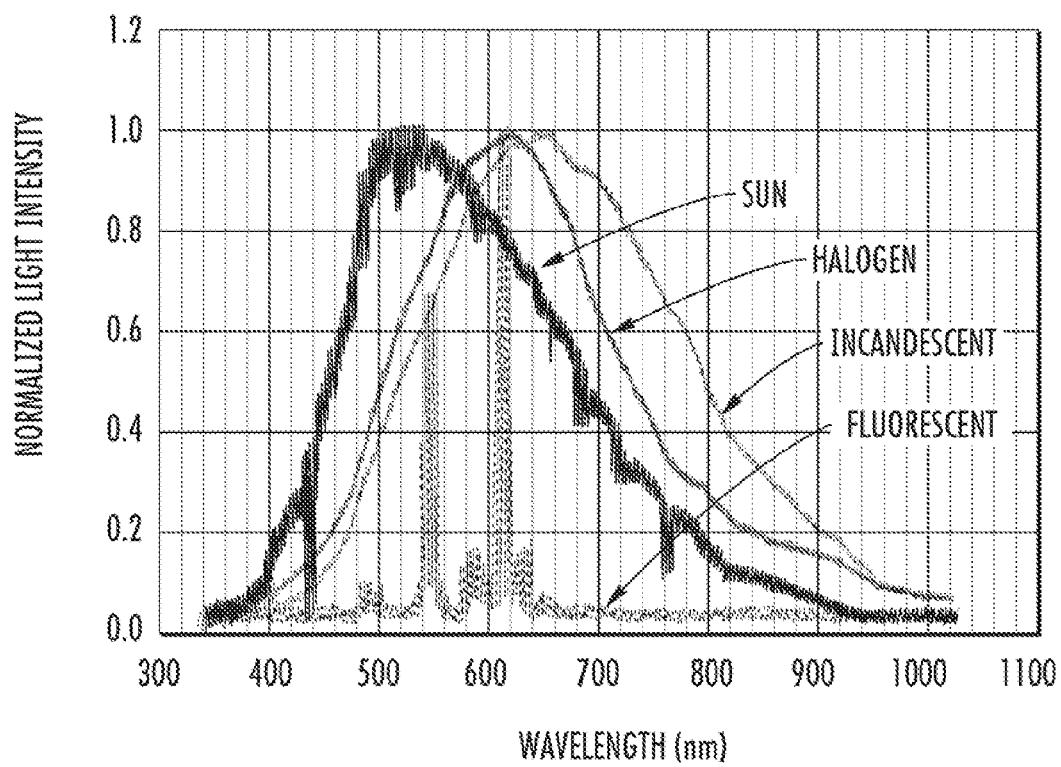
FIG. 1A shows the spectrum of different types of light.

A conventional analog-output IR proximity sensor typically includes discrete components, including an infrared (IR) light emitting diode (LED), a switch to turn the IR LED on and off, and an IR photo-diode (PD). During normal operation, the switch delivers current to the IR LED. The IR light emitted from the IR LED (or at least a portion of the IR light) will be reflected by an object when there is any, and be received by the PD. The PD converts the reflected light, as well as ambient light, to a current going to a resistor connected in parallel with the photo-diode. The analog output is the voltage across the resistor. The intensity of the reflected IR light received by the photo-diode is decreased at a rate of about $1/(4*X^2)$, where X is the distance between the object and the PD. However, as just mentioned, the total IR light received by the PD also includes ambient IR light, which may be from sun light, halogen light, incandescent light, fluorescent light, etc. FIG. 1A shows the spectrum of these different types of light.

Figure 1B:
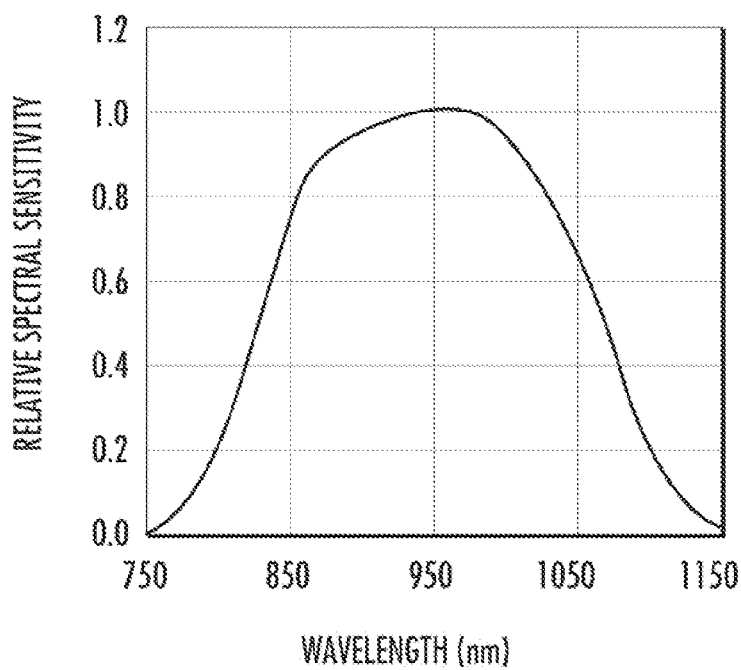
FIG. 1B shows an exemplary spectral response of an infrared (IR) photo-diode.

In order to improve the signal-to-noise ratio of the sensor, the PD of the convention analog-output proximity sensor is typically made with a relatively large sensor area and with a special package, which has a narrow band-pass filter with the peak at the IR LED's emitting wavelength. A typical spectral response of such an IR PD is shown in FIG. 1B. Additionally, to improve the signal-to-noise ratio, a relatively high current is typically used to drive the IR LED in order to emit a stronger IR light signal. The use of the large size sensor area, the special package and the high current make such conventional IR proximity sensors unsuitable, or at least not optimal, for cell-phone and other handheld-device applications.

DETAILED DESCRIPTION

Figure 2:
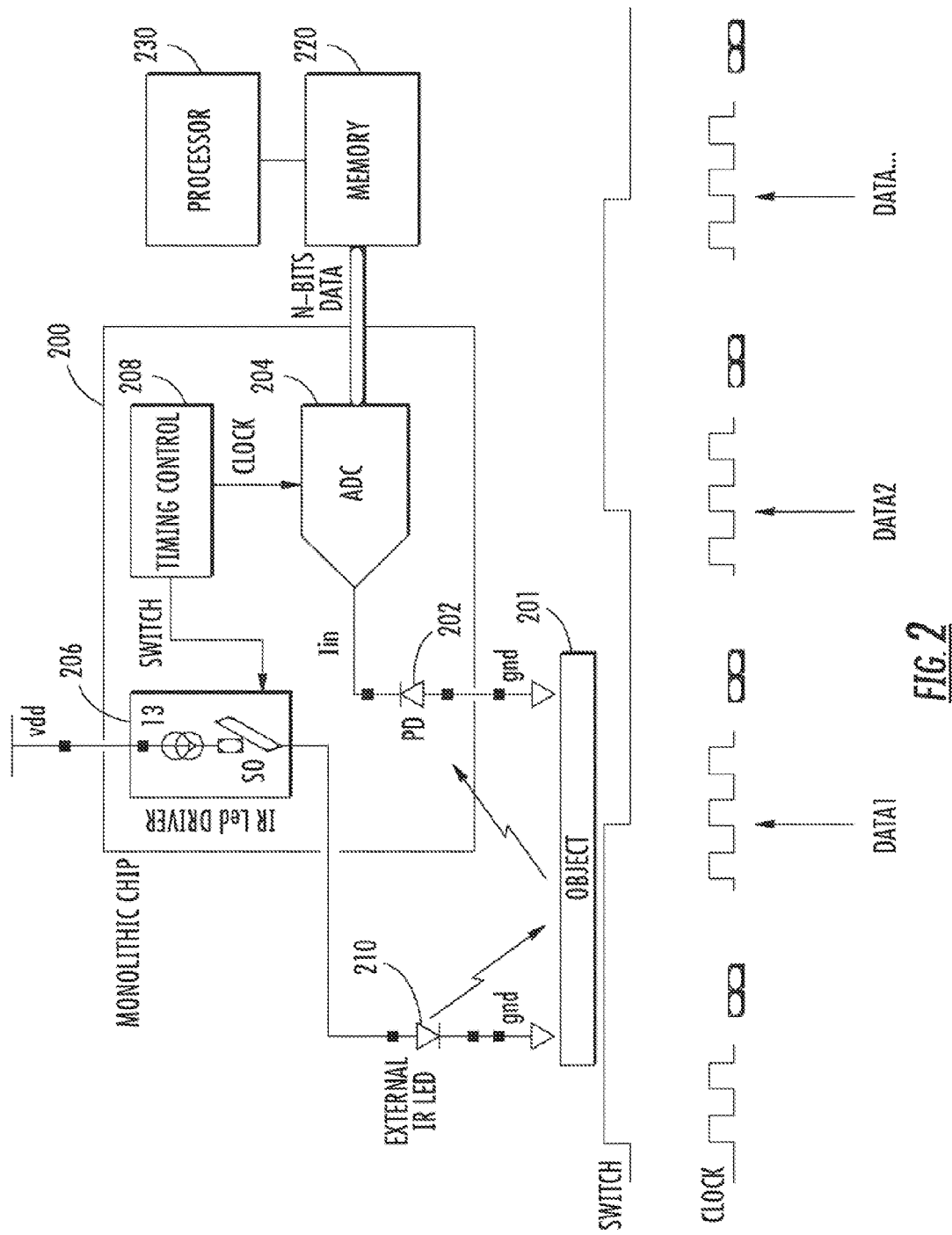
FIG. 2 shows a monolithic low-cost and low-power IR proximity sensor, according to an embodiment of the present invention, along with a corresponding possible timing diagram.
Figure 3:
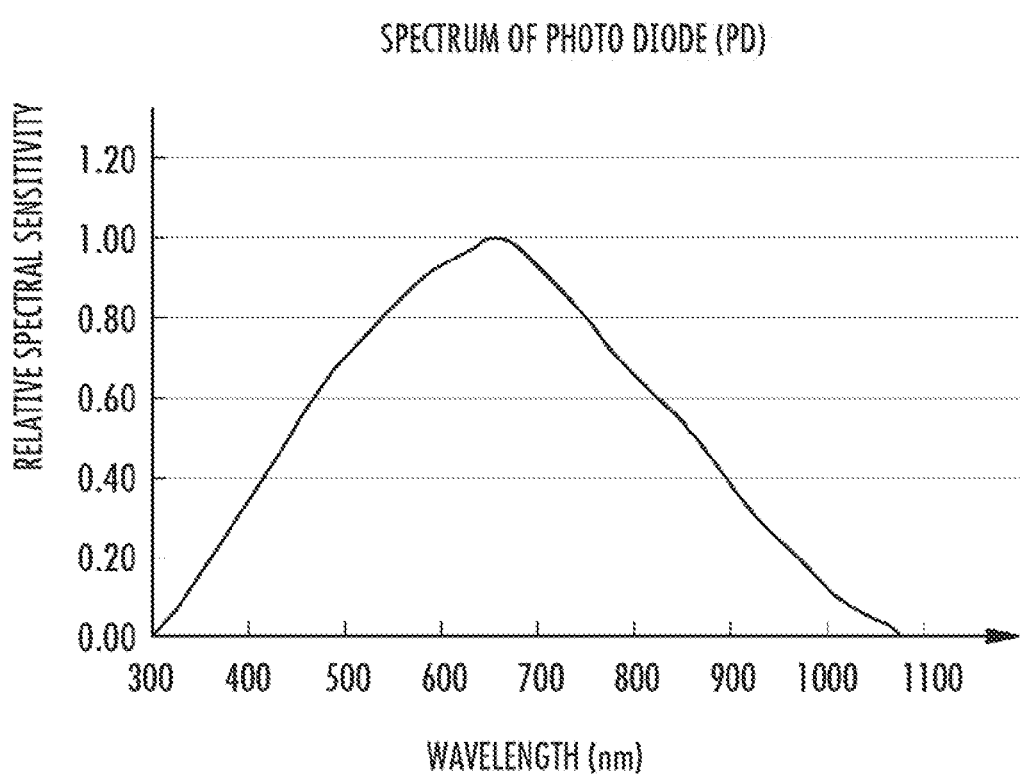
FIG. 3 shows an exemplary spectral response of the photo-diode (PD) of the proximity sensor of FIG. 2.
Figure 4:
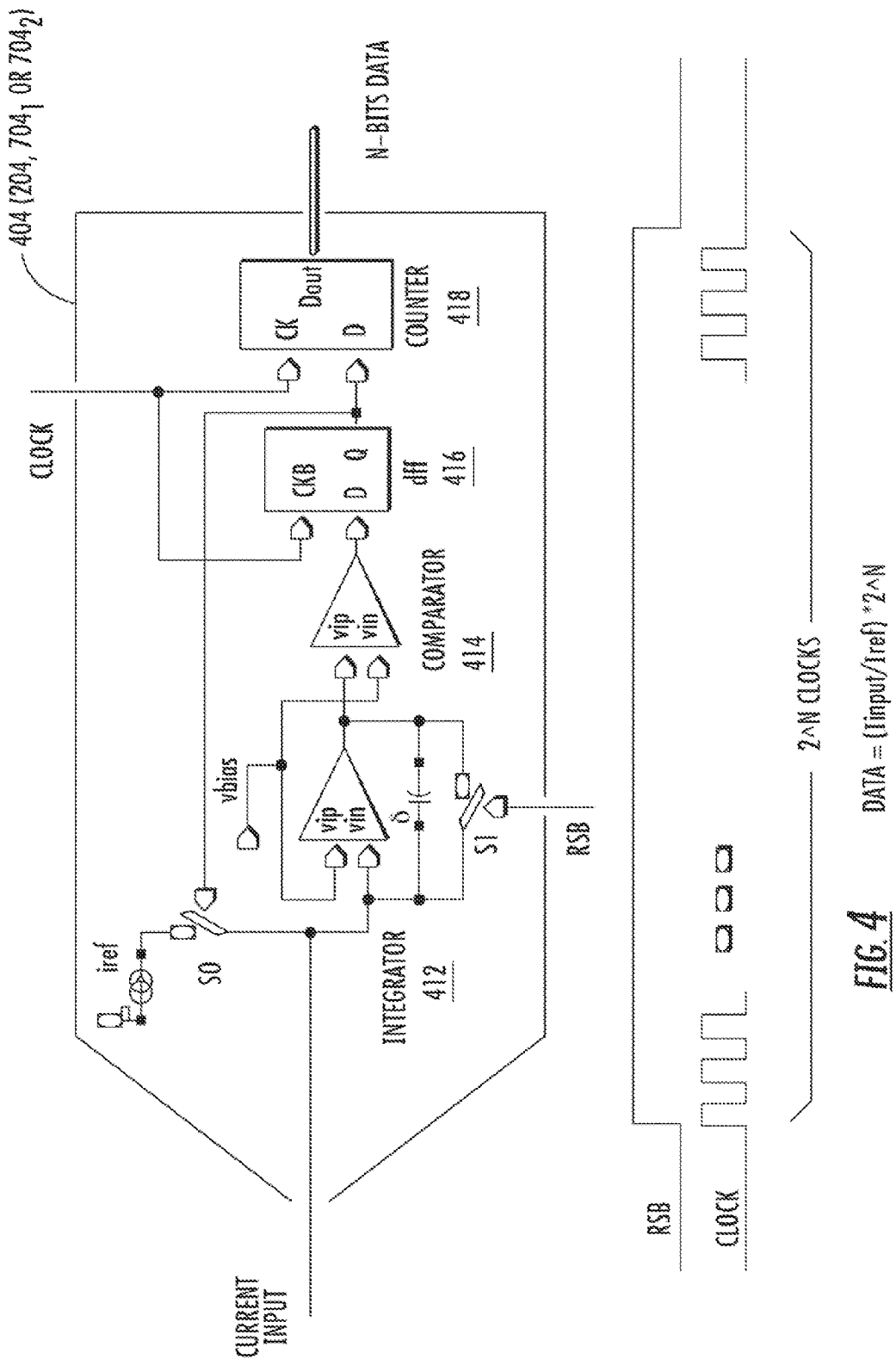
FIG. 4 shows an implementation of the analog-to-digital converter (ADC) of the proximity sensor of FIG. 2, according to an embodiment of the present invention, along with a corresponding possible timing diagram.

FIG. 2 shows a monolithic low-cost and low-power proximity sensor 200, according to an embodiment of the present invention, which includes a monolithic chip including a CMOS-integrated photo-diode 202, an analog-to-digital converter (ADC) 204, an IR LED driver 206 and a timing controller 208. The IR LED driver 206, which is controlled by the timing controller 208, selectively drives an external IR LED 210. In accordance with specific embodiments, the photo-diode (PD) 202 is a regular PN junction diode without any spectrum filter. A typical spectral response of such a PD is shown in FIG. 3. FIG. 4 shows one possible implementation of the ADC 204, and more specifically, a charge balanced ADC 404.

A benefit of the sensor 200 of FIG. 2 is that by providing direct conversion of a photo-current to a digital output, with the IR LED driver's output modulation, relatively small current signals can be processed with low-offset and high resolution. The principle of the operation of the sensor 200, in accordance with a specific embodiment of the present invention, is as follows:

During a $1^{st}$ conversion time, the IR LED driver 206 is off (i.e., switch S0 in FIG. 2 is open), and thus the external IR LED 210 is off (i.e., not producing any IR light). The output of the ADC 204 (DATA1) is indicative of (e.g., proportional to) the intensity of ambient light; and During a $2^{nd}$ conversion time, the IR LED driver 206 is on (i.e., switch S0 is closed), and thus the external IR LED 210 is on (i.e., producing IR light).

The output of the ADC 204 (DATA2) is indicative of (e.g., proportional to) the intensity of the ambient light and received IR light from the IR LED 210 reflected toward and detected by the PD 202. Note that when an object is not in proximity to the sensor 200, substantially no IR light produced by the IR LED 210 should be reflected back toward the PD, and thus, during this condition, the output of the ADC 204 (DATA2) will again be indicative of (e.g., proportional to) the intensity of the ambient light. Accordingly, the IR LED 210 and the PD 202 are preferably arranged, relative to one another, such that no IR light can travel directly from the IR LED 210 to the PD 202, but rather, the PD 202 should preferably only detect light from the IR LED 210 that has been reflected off an object 201 in proximity to the sensor 200. As the term is used herein, ambient light refers to background light, i.e., light already existing in an indoor or outdoor setting that is not caused by light produced by the IR LED 210. Such ambient light includes radiation over a wide range of wavelengths, including IR wavelengths.

The DATA1 and DATA2 values can be stored (e.g., in a memory 220, which may RAM, EPROM, registers, etc), allowing for their subtraction (e.g., by a processor 230 or digital subtraction circuitry). The DATA1 value is indicative of the intensity of ambient light (which can result from various light sources, such as those shown in FIG. 1A, and can include both visible and IR light, as can be appreciated from the PD spectrum shown in FIG. 3). The DATA2 value is indicative of the intensity of both the ambient light and the IR light produced by the IR LED 210 that was reflected off an object and detected by the PD 202. The subtraction can be a weighted subtraction, e.g., if the $1^{st}$ and $2^{nd}$ conversion times are not of equal duration. If the ambient light does not change during the $1^{st}$ and $2^{nd}$ conversion times, the subtraction of DATA2-DATA1 results in a value that is substantially proportional only to the intensity of the received IR light from the IR LED (i.e., the affect of the ambient light gets subtracted out), which should increase as an object gets closer to the sensor 200, and more specifically, closer to the PD 202. Conversely, the value of DATA2-DATA1 should decrease as an object gets farther away from the sensor 200. Accordingly the value of DATA2-DATA1 can be used to estimate proximity of the object.

As shown in the timing diagram of FIG. 2, the DATA1 and DATA2 outputs from the ADC 204 alternate. A plurality of values (produced by subtracting DATA1 from DATA2) can be determined, and then added (e.g., integrated or accumulated, using an integrator or accumulator), and the summed value can be used to estimate proximity of an object. Alternatively, a plurality of values (produced by subtracting DATA1 from DATA2) can be determined, and then averaged, and the averaged value can be used to estimate proximity of an object. In another embodiment, a plurality of DATA1 values can added (e.g., integrated or accumulated, using an integrator or accumulator) to produce a summed DATA1, and a plurality of DATA2 values can be added to produce an summed DATA2, and then the summed DATA1 can be subtracted from the summed DATA2, to produce a value that can be used to estimate proximity of an object. In still another embodiment, a plurality of DATA1 values can be averaged to produce an averaged DATA1, and a plurality of DATA2 values can be averaged to produce an averaged DATA2, and then the averaged DATA1 can be subtracted from the averaged DATA2, to produce a value that can be used to estimate proximity of an object. These are just a few examples, which are not meant to be limiting.

As long as the ambient light does not change in the course of the $1^{st}$ and $2^{nd}$ conversion times, the embodiment of FIG. 2 can provide high sensitivity for proximity sensing, even when there exists a lot of ambient light, because the ADC 204 can provide enough number of bits of data. However, in cell-phone and handheld device applications, environmental changes can occur relatively quickly, resulting in transient changes to the ambient light.

It is noted that the conversion times and DATA values can be numbered differently. In other words, it can be that during a $1^{st}$ conversion time the IR LED 210 is on, and during a $2^{nd}$ conversion time the IR LED is off. Using this numbering, the DATA1 value would be indicative of the intensity of both the ambient light and the IR light produced by the IR LED 210 that was reflected off and detected by the PD 202, and the DATA2 value would be indicative of the intensity of the ambient light. Here, the value of DATA1-DATA2 could be used to estimate proximity of the object.

Figure 5:
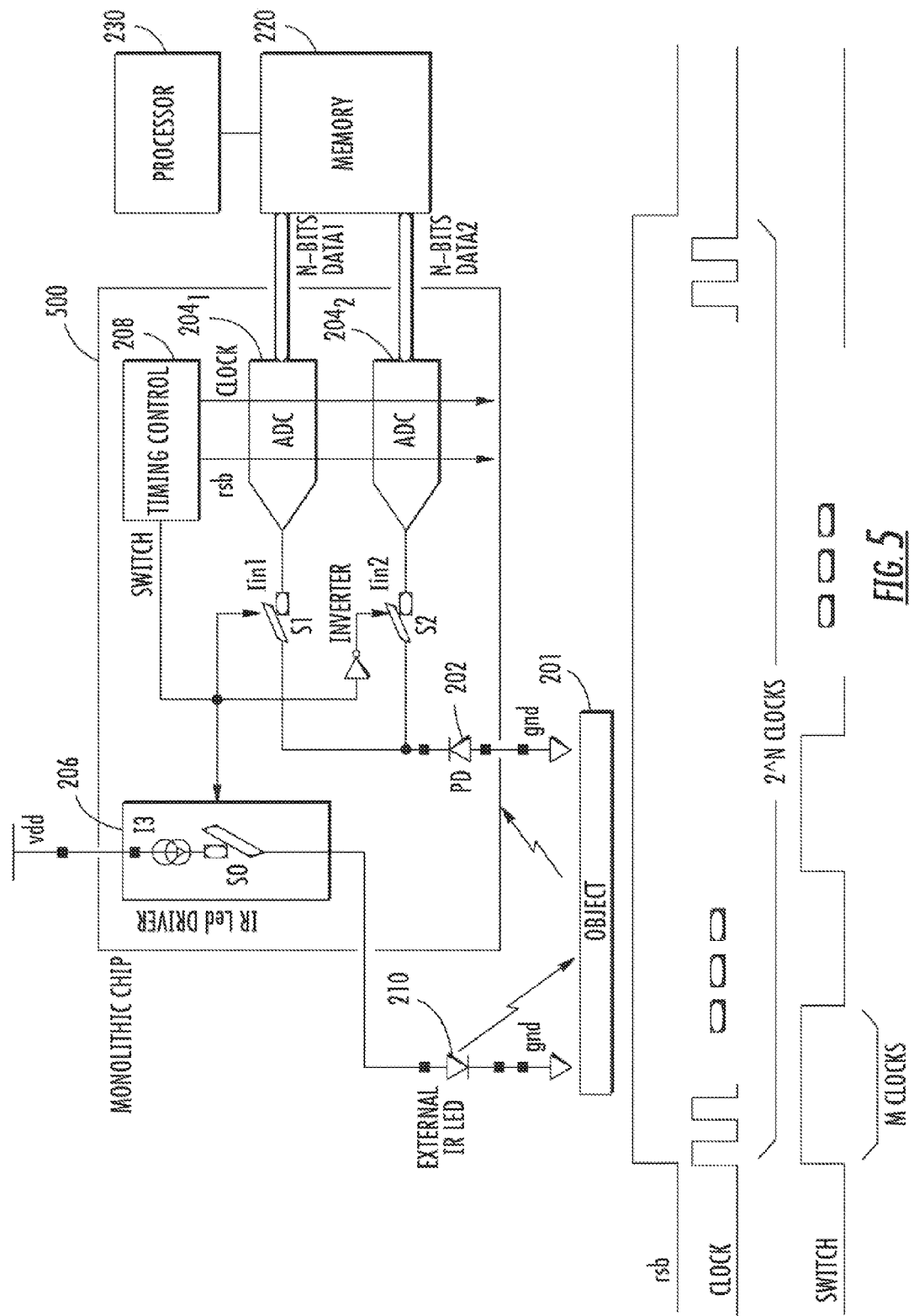
FIG. 5 shows a monolithic proximity sensor, according to a further embodiment of the present invention, along with a corresponding possible timing diagram.

FIG. 5 shows a monolithic proximity sensor 500, according to a further embodiment of the present invention. Here, two ADCs 204₁ and 204₂ are used and the IR LED driver 206 is turned on and off, e.g., with 50% duty-cycle. Each on-time includes M clock periods, where M is an integer (1, 2, 3 . . . ). The output current of the photo-diode 202 is switched between the inputs of the two ADCs 204₁ and 204₂ according to the timing diagram. With this dual-ADCs architecture and this switch-timing scheme, the effect of the ambient light change is substantially removed. In this embodiment, to compensate for gain mismatch between the two ADCs 204₁ and 204₂ that can cause errors in proximity sensing, a trimming circuit can be used to improve the gain matching. The charge balanced ADC 404, shown in FIG. 4, can be used to implement the two ADCs 204₁ and 204₂.

Figure 6:
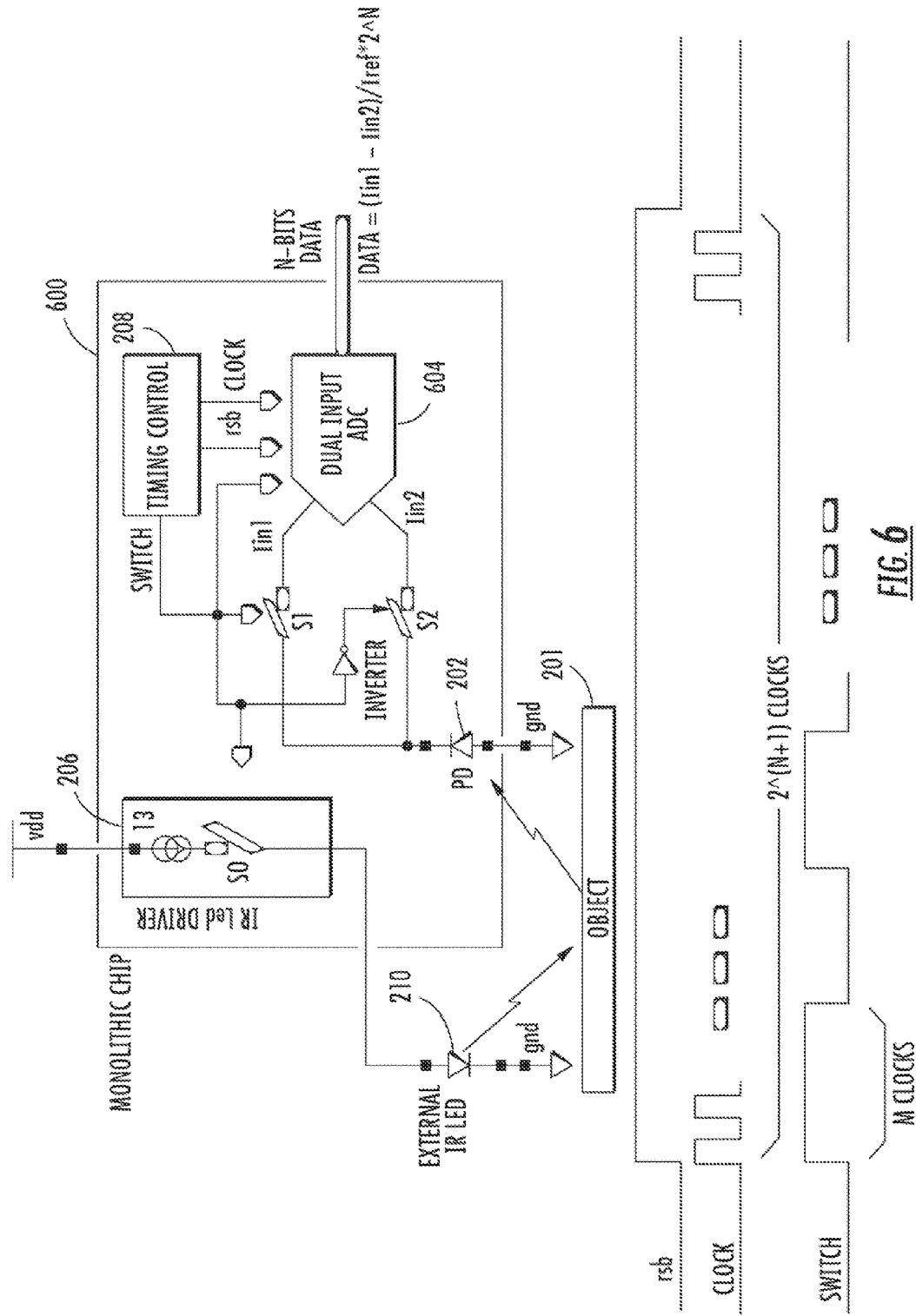
FIG. 6 shows a monolithic proximity sensor, according to still another embodiment of the present invention, along with a corresponding possible timing diagram.

FIG. 6 shows a monolithic proximity sensor 600, according to another embodiment of the present invention. Here, a dual-input single output ADC 604 is used. In specific embodiments, the dual-input single output ADC 604 can include dual-integrators, which would eliminate any need for a trimming circuit. The output of the ADC 604 is substantially proportional to only the intensity of received IR light emitted from the IR LED 210 (i.e., the effect of the ambient light is substantially removed).

Figure 7:
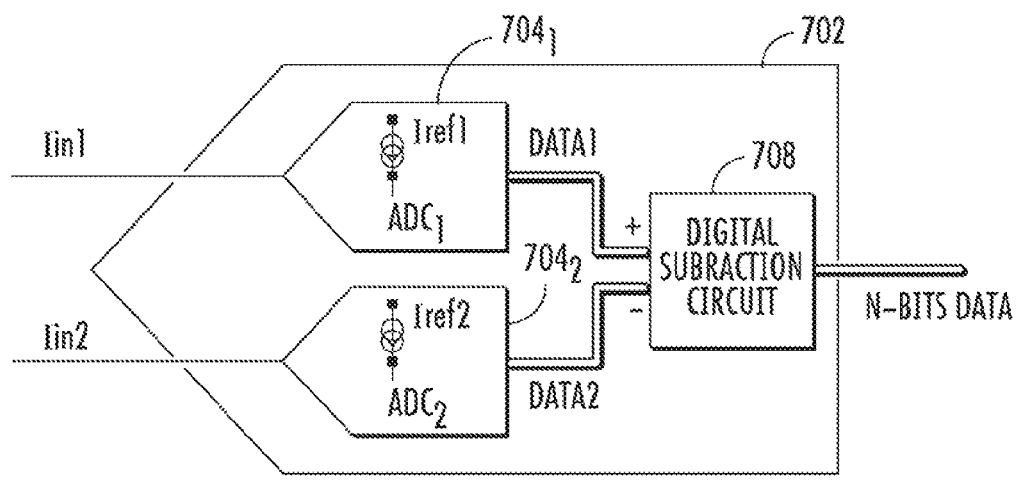
FIG. 7 shows a dual-input single output ADC, which can be used as the ADC in the proximity sensor of FIG. 6, in accordance with an embodiment of the present invention.
Figure 8:
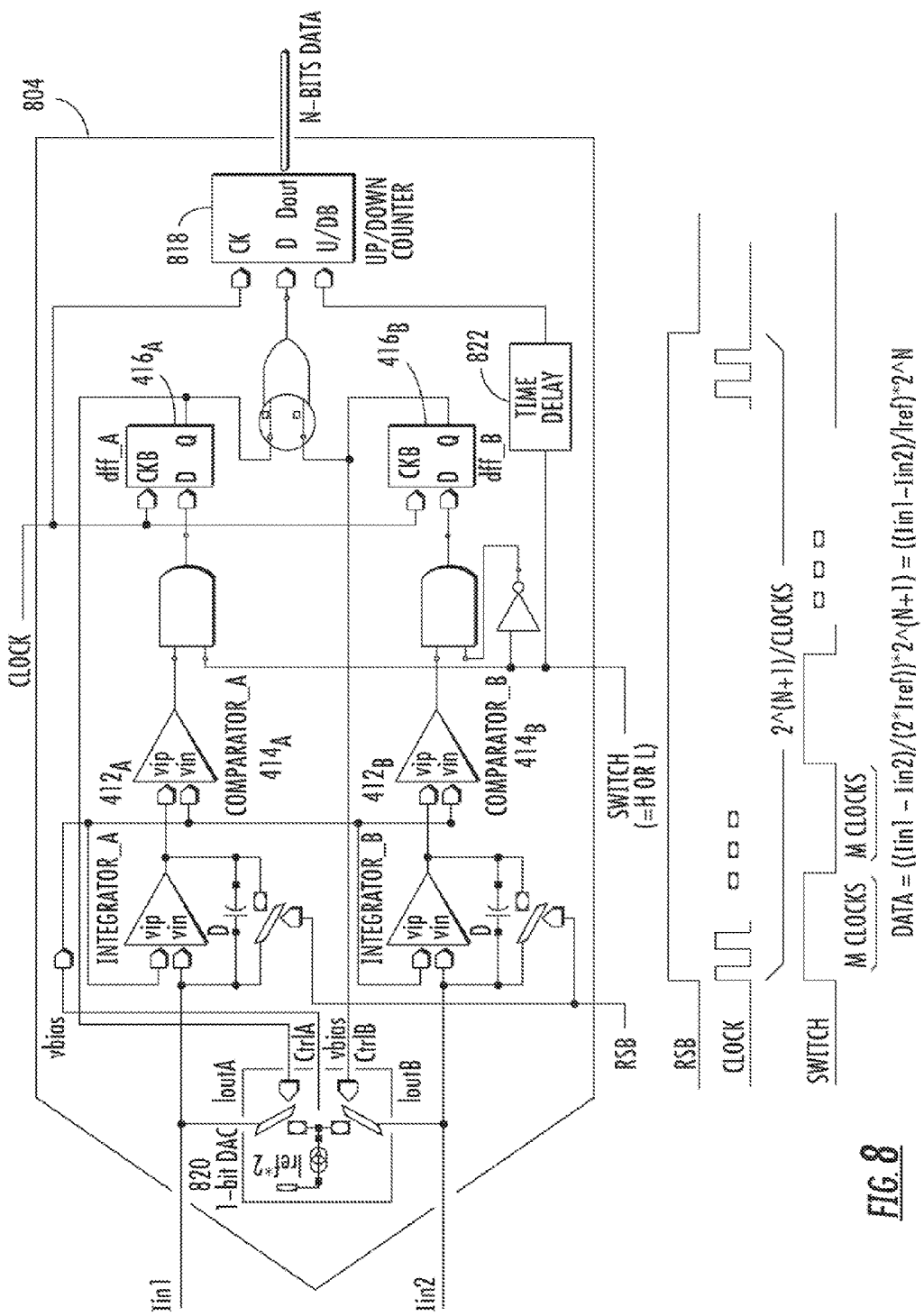
FIG. 8 shows another dual-input single output ADC, which can be used as the ADC in the proximity sensor of FIG. 6, in accordance with an embodiment of the present invention.

FIG. 7 shows one embodiment of a dual-input single output ADC 702, which can be used for ADC 604 in FIG. 6. FIG. 8 shows another embodiment of a dual-input single output ADC 804, which can be used for ADC 604 in FIG. 6. Alternative embodiments of a dual-input single output ADC besides those shown in FIGS. 7 and 8 are also possible, and within the scope of the present invention. Ideally, the dual-input single output ADC in current mode will realize the following function:

$$\text{Data} = ((I_{in1} - I_{in2})/I_{ref}) * 2^N \quad (1)$$

Here, Data is the digital output of the ADC, N is the number of bits in the output of the ADC, Iref is the reference current, and Iin1 and Iin2 are the dual current inputs.

Referring to FIG. 7, the dual-input single output ADC 702, according to an embodiment of the present invention, is implemented with two of conventional single input ADCs (ADC 704$_1$ and ADC 704$_2$) and a digital subtraction circuit 708. The output can be expressed as:

$$\text{Data} = (\text{Iin1}/\text{Iref1} - \text{Iin2}/\text{Iref2}) * 2^N \quad (2)$$

Here, Iin1 and Iin2 are the input currents, respectively, for the ADC 704$_1$ and the ADC 704$_2$, and Iref1 and Iref2 are the ADCs' reference currents. In order to realize the function given by Equation (1) from Equation (2), a trimming circuit should be used to achieve the gain-matching, i.e., to match Iref1 to Iref2. The higher the resolution of the ADC (i.e., the greater the number of output bits), the more difficult it would be to implement such a trimming circuit.

FIG. 4, introduced above, shows some exemplary details of each of the ADC 704$_1$ and the ADC 704$_2$, where each ADC is implemented as a conventional single input ADC 404 which relies on the charge-balancing technique. As shown in FIG. 4, each ADC can include an integrator 412, a comparator 414, a D flip-flop (dff) 416, and a counter 418. For each data (i.e., analog to digital) conversion with N bits, 2^N clock periods are needed. During each conversion time, the number of 1s from the dff 416 are counted, and a charge of Tclock*Iref is delivered to the integrator 412 for each corresponding 1. Here, Tclock is the clock period and Iref is the reference current. According to charge conservation:

$$\text{Iin} * T\text{clock} * 2^N = \text{Iref} * T\text{clock} * \text{Data} \quad (3)$$

Here, Iin is the input current and Data is the counter's output. The left side of the equation represents the total charge removed from the integrator by the input current, and the right side represents the total charge delivered to the integrator by the reference current. From (3), the digital output can be expressed as:

$$\text{Data} = (\text{Iin}/\text{Iref}) * 2^N \quad (4)$$

FIG. 8 shows the architecture of the dual-input single output ADC 804, implemented with dual integrators, in accordance with a further embodiment of the present invention. As mentioned above, the dual input ADC 804 can be used to implement the dual input ADC 604 in FIG. 6. The ADC 804 realizes the function given by (1), and at the same time alleviates any need for a trimming circuit. The ADC 804 is shown as including a pair of integrators 412$_A$ and 412$_B$, a pair of comparators 414$_A$ and 414$_B$, a pair of D flip-flops 416$_A$ and 416$_B$, and an up-down counter 818. The ADC 404 is also shown as including a 1-bit DAC 820, and a time delay 822. The operation of the ADC 404 is described below. Suppose M=1 for the simplicity:

During SWITCH=H, the output from the comparator 414$_A$, which compares the output of the integrator 412$_A$ to a bias voltage (vbias), is enabled. If a 1 from the output of the comparator 414$_A$ is latched by dff 416$_A$ on the clock's falling edge, a charge of 2*Iref*Tclock is delivered to the integrator 412$_A$; at the same time, the 1 is counted up by the up/down counter 818.

During SWITCH=L, the output from comparator 414$_B$, which compares the output of the integrator 412$_B$ to the same bias voltage (vbias), is enabled. If a 1 from the output of the comparator 414$_B$ is latched by dff 416$_B$ on the clock's falling edge, a charge of 2*Iref*Tclock is delivered to integrator 412$_B$; at the same time, the 1 is counted down by the up/down counter 818.

For each conversion, the numbers of count-up and count-down can be expressed as:

$$\text{Iin}A * T\text{clock} * 2^{(N+1)} = (2 * \text{Iref}) * T\text{clock} * UP \quad (5)$$

$$\text{Iin}B * T\text{clock} * 2^{(N+1)} = (2 * T\text{ref}) * T\text{clock} * DOWN \quad (6)$$

According to (5) and (6), the output of the up/down counter 818 can be expressed as:

$$\begin{aligned}\text{Data} &= UP - DOWN \\ &= (\text{Iin1}/\text{Iref}) * 2^{\wedge}N - (\text{Iin2}/\text{Iref}) * 2^{\wedge}N \\ &= ((\text{Iin1} - \text{Iin2})/\text{Iref}) * 2^{\wedge}N\end{aligned} \quad (7)$$

In accordance with an embodiment, an accumulator can be used in place of the up-down counter 818.

Figure 9:
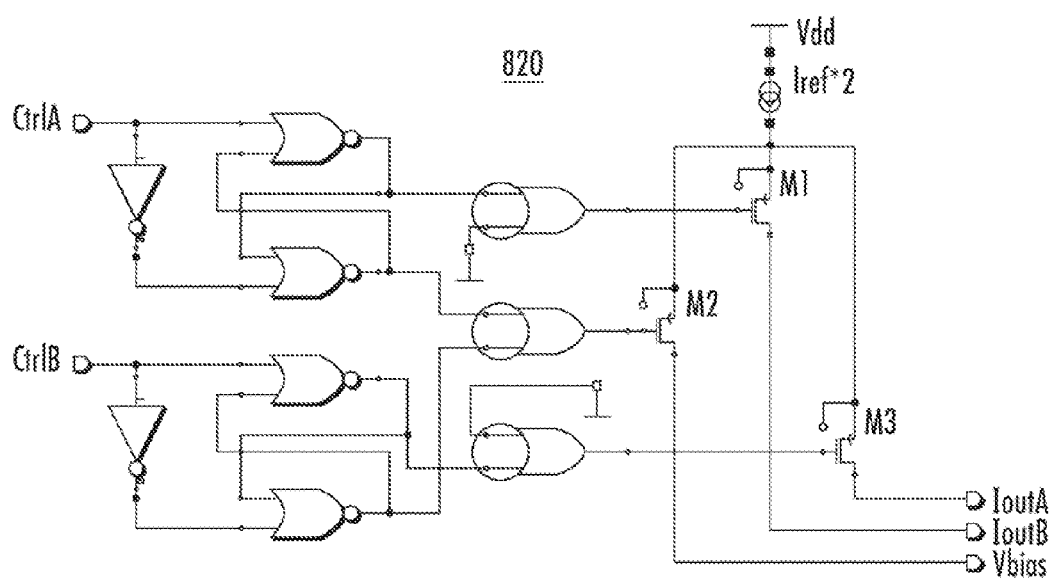
FIG. 9 shows a schematic of the 1-bit digital-to-analog converter (DAC), in accordance with an embodiment of the present invention, which can be used in the ADC of FIG. 8.

FIG. 9 shows a schematic of the 1-bit DAC (digital-to-analog converter) 820, in accordance with an embodiment of the present invention, which produces three output, and which is useful with the ADC architecture with dual integrators. CtrlA is used to steer the reference current between the outputs of vbias and IoutA; CtrlB is used to steer the reference current between the output of vbias and IoutB. When CtrlA=1 and CtrlB=0, then the current of Iref*2 flows to IoutA. When the CtrlA=0 and CtrlB=1, then the current of Iref*2 flows to IoutB. When the CtrlA=0 and CtrlB=0, the current of Iref*2 flows to Vbias. Referring back to FIG. 8, there is no case where CtrlA=1 and CtrlB=1, i.e., no case where both switches shown in block 820 are closed. Referring again to FIG. 9, the INVERTER-gate and two cross-coupled NOR-gates to CtrlA or CtrlB are used to generate two pairs of over-lapping clocks to prevent the cut-off of the reference current during the steering. The three OR-gates are used to match the time delays of over-lapping clocks for each pair. Alternative configurations of the 1-bit DAC 820 are possible, and within the scope of the present invention.

It is within the scope of the present invention to use alternative light sources, i.e., besides an LED. For example, a laser diode can be used to produce light in place of an LED. Alternatively, an incandescent light can be used in place of an LED. These are just a few examples, which are not meant to be limiting. In the above described embodiments, the light source (e.g., LED 210) was described as producing IR light. In alternative embodiments, a controlled light source can produce alternative wavelengths of light, such as, but not limited to, light in the visible spectrum (e.g., blue, green or red light).

Figure 10:
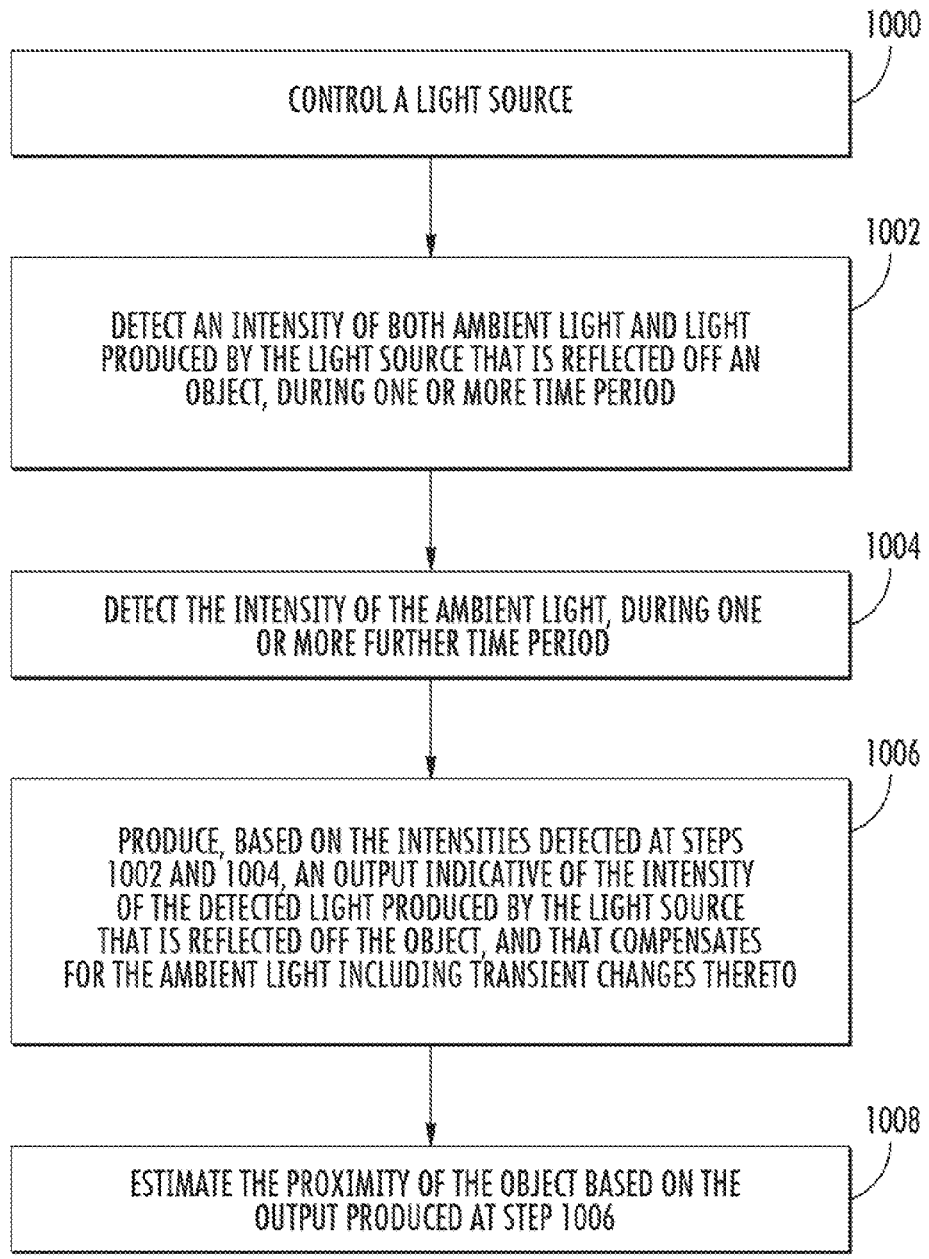
FIG. 10 is a high level flow diagram that is used to summarize various methods for determining the proximity of an object, in accordance with various embodiments of the present invention.

The high level flow diagram of FIG. 10 is used to describe various methods, according to various embodiments of the present invention, for use in monitoring the proximity of an object. Referring to FIG. 10, at step 1000, a light source is controlled, e.g., using a controller and/or a driver. For example, as described above, the light source can be selectively turned on and off. At step 1002, an intensity of both ambient light and light produced by the light source that is reflected off the object is detected during one or more time period. At step 1004, the intensity of the ambient light is detected during one or more further time period, while the light source is not producing light. For example, detection time periods of step 1002 and detection time periods of time 1004 can be interspersed, as was described above. At step 1006, based on the intensities detected at steps 1002 and 1004, an output is produced that is indicative of the intensity of the detected light produced by the light source that is reflected off the object, and that compensates for the ambient light including transient changes thereto. Preferably, the affect of the ambient light is substantially removed, so that the ambient light will not affect estimates of the proximity of the object, which can be determined at step 1008. For example, at step 1008, the output produced at step 1006 can be compared to one or more threshold to estimate the proximity of the object. In accordance with certain embodiments, the output can be produced at step 1006, by subtracting the intensity detected at step 1004 from the intensity detected at step 1002. Such a subtraction may be a weighted subtraction. In accordance with specific embodiments, a dual-input single output analog to digital converter (ADC) is used to produce the output that can be used to estimate proximity of the object, as was described above, e.g., with reference to FIGS. 6 and 8.

Proximity sensors of embodiments of the present invention can be used in various systems, including, but not limited to, cell-phones and handheld-devices. Referring to the system 1100 of FIG. 11, for example, a proximity sensor (e.g., 200, 500 or 600) can be used to control whether a subsystem 1106 (e.g., a touch-screen, backlight, virtual scroll wheel, virtual keypad, navigation pad, etc.) is enabled or disabled. For example, the proximity sensor can detect when an object, such as a person's finger, is approaching, and based on the detection either enable (or disable) a subsystem 1106. More specifically, one or more output of the proximity sensor (e.g., 200, 500 or 600) can be provided to a comparator or processor 1104 which can, e.g., compare the output(s) of the proximity sensor to a threshold, to determine whether the object is within a range where the subsystem 1106 should be enabled (or disabled, depending on what is desired). Multiple thresholds can be used, and more than one possible response can occur based on the detected proximity of an object. For example, a first response can occur if an object is within a first proximity range, and a second response can occur if the object is within a second proximity range.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method for use in monitoring the proximity of an object, comprising:
   (a) controlling a light source;
   (b) during one or more time period, detecting an intensity of both ambient light and light produced by the light source that is reflected off the object;
   (c) during one or more further time period while the light source is not producing light, detecting the intensity of the ambient light; and
   (d) producing, based on the intensities detected at steps (b) and (c), an output indicative of the intensity of the detected light produced by the light source that is reflected off the object, and that compensates for the ambient light including transient changes thereto so that an affect of the ambient light on the output is substantially removed;
   wherein because the affect of the ambient light on the output is substantially removed, the output produced at step (d) can be used to produce one or more estimate of the proximity of the object that is/are substantially unaffected by the ambient light.

2. The method of claim 1, wherein:
   step (b) comprises detecting the intensity of both ambient light and light produced by the light source that is reflected off the object during a first plurality of time periods; and
   step (c) comprise detecting the intensity of the ambient light during a second plurality of time periods;
   at least some of the first plurality of time periods of step (b) are interspersed with at least some of the second plurality of time periods of step (c).

3. The method of claim 1, wherein:
   step (a) includes, during the one or more time period, producing infrared (IR) light;
   step (b) includes, during the one or more time period, detecting the intensity of both ambient light and the produced IR light that is reflected off the object; and
   step (c) includes, during the one or more further period, detecting the intensity of the ambient light.

4. The method of claim 1, further comprising:
   (e) comparing the output produced at step (d) to one or more threshold to estimate the proximity of the object.

5. A method for use in monitoring the proximity of an object, comprising:
   (a) controlling a light source;
   (b) during one or more time period, detecting an intensity of both ambient light and light produced by the light source that is reflected off the object;
   (c) during one or more further time period while the light source is not producing light, detecting the intensity of the ambient light; and
   (d) producing, based on the intensities detected at steps (b) and (c), an output indicative of the intensity of the detected light produced by the light source that is reflected off the object, and that compensates for the ambient light including transient changes thereto;
   wherein the output can be used to estimate the proximity of the object;
   wherein step (d) comprises producing the output by subtracting one or more value indicative of the intensity detected at step (c) from one or more value indicative of the intensity detected at step (b).

6. The method of claim 5, wherein the subtracting can be a weighted subtracting.

7. A method for use in monitoring the proximity of an object, comprising:
   (a) controlling a light source;
   (b) during one or more time period, detecting an intensity of both ambient light and light produced by the light source that is reflected off the object;
   (c) during one or more further time period while the light source is not producing light, detecting the intensity of the ambient light; and
   (d) producing, based on the intensities detected at steps (b) and (c), an output indicative of the intensity of the detected light produced by the light source that is reflected off the object, and that compensates for the ambient light including transient changes thereto;
   wherein the output produced at step (d) can be used to estimate the proximity of the object; and
   wherein step (d) includes:
      increasing a count value of an up-down counter or an accumulator based on the intensity detected at step (b); and
      decreasing a count value of the up-down counter or the accumulator based on the intensity detected at step (c);

wherein the output produced at step (d) is an output of the up-down counter or the accumulator.

8. A method for use in monitoring the proximity of an object, comprising:
(a) controlling a light source;
(b) during one or more time period, detecting an intensity of both ambient light and light produced by the light source that is reflected off the object;
(c) during one or more further time period while the light source is not producing light, detecting the intensity of the ambient light; and
(d) producing, based on the intensities detected at steps (b) and (c), an output indicative of the intensity of the detected light produced by the light source that is reflected off the object, and that compensates for the ambient light including transient changes thereto;
wherein the output produced at step (d) can be used to estimate the proximity of the object; and
wherein step (d) includes using a dual-input single output analog to digital converter (ADC) to produce the output that can be used to estimate the proximity of the object.

9. A method for use in monitoring the proximity of an object, comprising:
(a) controlling a light source;
(b) during one or more time period, detecting an intensity of both ambient light and light produced by the light source that is reflected off the object;
(c) during one or more further time period while the light source is not producing light, detecting the intensity of the ambient light; and
(d) producing, based on the intensities detected at steps (b) and (c), an output indicative of the intensity of the detected light produced by the light source that is reflected off the object, and that compensates for the ambient light including transient changes thereto;
wherein step (a) comprises selectively driving an infrared light emitting diode (IR LED); and
wherein step (b) comprises detecting light at a photodiode (PD);
wherein during the one or more time period of step (b), the intensity of the light detected by the PD is indicative of both ambient light and IR light produced by an IR LED that is reflected off the object;
wherein during the one or more further time period of step (c), the intensity of the light detected by the PD is indicative of the intensity of the ambient light; and
wherein the output produced at step (d) can be used to estimate the proximity of the object.

10. A proximity sensor, comprising:
a driver to selectively drive a light source;
a photo-diode (PD) that produces a current signal indicative of the intensity of light detected by the PD, the PD capable of detecting ambient light and detecting light produced by the light source that is reflected off an object; and
an analog-to-digital converter (ADC) that receives one or more portion of the current signal produced by the PD;
wherein the ADC produces one or more digital output that can be used to estimate the proximity of an object to the PD in a manner that compensates for the ambient light detected by the PD and transient changes to the detected ambient light.

11. The proximity sensor of claim 10, wherein:
when the driver is driving the light source, the ADC produces one or more first digital value indicative of both the intensity of ambient light detected by the PD, and an intensity of the light produced by the light source that is reflected off an object and detected by the PD; and
when the driver is not driving the light source, the ADC produces one or more second digital value indicative of the intensity of the ambient light detected by the PD.

12. The proximity sensor of claim 11, wherein:
a difference between the first and second digital values is indicative of the intensity of the light produced by the light source that is reflected off the object and detected by the PD; and
the difference between the first and second digital values can be used to estimate the proximity of the object relative to the PD.

13. The proximity sensor of claim 10, wherein:
the ADC comprises a dual input single output ADC;
a first input of the ADC receives one or more portion of the current signal, produced by the PD, indicative of both the intensity of ambient light detected by the PD, and the intensity of the light produced by the light source that is reflected off an object and detected by the PD; and
a second input of the ADC receives one or more further portion of the current signal, produced by the PD, indicative of the intensity of the ambient light detected by the PD.

14. The proximity sensor of claim 13, wherein the dual input single output ADC includes:
a pair of integrators;
a pair of comparators; and
a 1-bit digital to analog converter (DAC) that produces three outputs including a first reference current that is provided to one of the integrators, a second reference current that is provided to the other one of the integrators, and a reference voltage that is provided to the comparators.

15. The proximity sensor of claim 13, wherein the dual input single output ADC includes up-down counter that selectively counts up or down, to thereby produce at the single output a digital value indicative of the intensity of the light produced by the light source that is reflected off the object and detected by the PD.

16. The proximity sensor of claim 10, further comprising:
a further ADC that receives one or more further portion of the current signal produced by the PD;
switches; and
a controller to control the driver and the switches;
wherein the controller controls the switches to direct portions of the current signal produced by the PD to either the ADC or the further ADC;
wherein the ADC produces one or more first digital value indicative of both an intensity of the ambient light detected by the PD, and an intensity of the light produced by the light source that is reflected off an object and detected by the PD; and
wherein the further ADC produces one or more second digital value indicative of the intensity of the ambient light detected by the PD.

17. The proximity sensor of claim 16, wherein:
a difference between the first and second digital values is indicative of the intensity of the light produced by the light source that is reflected off the object and detected by the PD; and
the difference between the first and second digital values can be used to estimate the proximity of the object relative to the PD.

18. The proximity sensor of claim 10, further comprising:
a controller to control the driver.

19. The proximity sensor of claim 18, wherein the proximity sensor comprises a monolithic chip that includes the driver, the controller, the PD and the ADC.

20. The proximity sensor of claim 19, wherein the monolithic chip includes:
   a first terminal configured to be connected to a terminal of a light emitting diode or laser diode, so that the driver can selectively drive the light emitting diode or laser diode.

21. The proximity sensor of claim 20, wherein the monolithic chip further includes:
   an output terminal configured to output an interleaved stream of first and second digital data values, wherein a difference between the first and second digital values can be used to estimate the proximity of the object relative to the PD.

22. The proximity sensor of claim 20, wherein the monolithic chip further includes:
   an output terminal configured to output one or more digital data value that can be used to estimate the proximity of the object relative to the PD.

23. The proximity sensor of claim 20, wherein the monolithic chip further includes:
   a first output terminal configured to output one or more first digital data value indicative of both the intensity of ambient light detected by the PD, and an intensity of the light produced by the light source that is reflected off an object and detected by the PD; and
   a second output terminal configured to output one or more second digital data value indicative of the intensity of the ambient light detected by the PD;
   wherein a difference between the first and second digital values is indicative of the intensity of the light produced by the light source that is reflected off the object and detected by the PD; and
   wherein the difference between the first and second digital values can be used to estimate the proximity of the object relative to the PD.

24. A proximity sensor, comprising:
   a driver to selectively drive a light source;
   a photo-diode (PD) that produces a current signal indicative of an intensity of light detected by the PD;
   an analog-to-digital converter (ADC) that includes a first input, a second input and an output;
   a controller to control the driver and to control switches that direct portions of the current signal produced by the PD to either the first input or the second input of the ADC;
   wherein the ADC includes up-down counter that selectively counts up or down, based on the portions of the current signal provided to the first and second inputs, to thereby produce a count value that is indicative of light produced by the light source that is reflected off an object and detected by the PD; and
   wherein the count value, which is provided at the output of the ADC, can be used to estimate the proximity of an object to the PD.

25. A system, comprising:
   a driver to selectively drive a light source;
   a photo-diode (PD) that produces a current signal indicative of the intensity of light detected by the PD, the PD capable of detecting ambient light and detecting light produced by the light source that is reflected off an object; and
   an analog-to-digital converter (ADC) that receives one or more portion of the current signal produced by the PD;
   wherein the ADC produces one or more digital output indicative of the proximity of an object to the PD in a manner that compensates for the ambient light detected by the PD and transient changes to the detected ambient light;
   a comparator or processor that receives the one or more digital output and enables or disables a subsystem based on the one or more digital signal indicative of the proximity of the object to the PD.

* * * * *